United States Patent
Itakura et al.

(10) Patent No.: US 9,485,054 B2
(45) Date of Patent: Nov. 1, 2016

(54) TRANSMISSION DEVICE, RECEPTION DEVICE AND COMMUNICATION SYSTEM

(75) Inventors: Eisaburo Itakura, Kanagawa (JP); Hideki Iwami, Saitama (JP); Satoshi Tsubaki, Kangawa (JP); Hiroaki Takahashi, Kanagawa (JP); Kei Kakitani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 376 days.

(21) Appl. No.: 13/391,257

(22) PCT Filed: Jun. 17, 2011

(86) PCT No.: PCT/JP2011/003477
§ 371 (c)(1),
(2), (4) Date: Feb. 17, 2012

(87) PCT Pub. No.: WO2011/161922
PCT Pub. Date: Dec. 29, 2011

(65) Prior Publication Data
US 2012/0147140 A1 Jun. 14, 2012

(30) Foreign Application Priority Data
Jun. 24, 2010 (JP) .................... 2010-143649

(51) Int. Cl.
*H04N 7/26* (2006.01)
*H04N 19/70* (2014.01)
*H04N 19/89* (2014.01)
(Continued)

(52) U.S. Cl.
CPC ............. *H04L 1/0041* (2013.01); *H04L 1/007* (2013.01); *H04L 1/0057* (2013.01); *H04L 1/1812* (2013.01); *H04N 13/0059* (2013.01); *H04N 19/115* (2014.11); *H04N 19/15* (2014.11); *H04N 19/188* (2014.11); *H04N 19/37* (2014.11);
(Continued)

(58) Field of Classification Search
CPC ...... H04N 13/0029; H04N 7/26; H04N 7/64; H04N 2013/00
See application file for complete search history.

(56) References Cited

U.S. PATENT DOCUMENTS 6,072,831 A * 6/2000 Chen ........................ 375/240.03
2002/0080802 A1 6/2002 Sachs et al.
(Continued)

FOREIGN PATENT DOCUMENTS

AT 340483 10/2006
AU 2006248710 5/2006
(Continued)

OTHER PUBLICATIONS

Tan, Serdar A., et al. "Error Resilient Layered Stereoscopic Video Streaming." Jun. 2007. Proceedings of 3DTV Conference.*
(Continued)

*Primary Examiner* — Dave Czekaj
*Assistant Examiner* — Kyle Lotfi
(74) *Attorney, Agent, or Firm* — Frommer Lawrence & Haug LLP; William S. Frommer (57) ABSTRACT

A video image data encoder comprises an input to receive stereoscopic image data. The stereoscopic image data includes first and second image data having chronological correspondence. An error correction encoding unit combines portions of the first image data and corresponding portions of the second image data from the input unit into a common encoding matrix. An error correcting code derived from the combined portions is added to the encoding matrix.

11 Claims, 10 Drawing Sheets

(51) Int. Cl.

| | |
|---|---|
| *H04N 19/65* | (2014.01) |
| *H04N 13/00* | (2006.01) |
| *H04L 1/00* | (2006.01) |
| *H04L 1/18* | (2006.01) |
| *H04N 21/236* | (2011.01) |
| *H04N 19/597* | (2014.01) |
| *H04N 19/15* | (2014.01) |
| *H04N 19/115* | (2014.01) |
| *H04N 19/37* | (2014.01) |
| *H04N 19/169* | (2014.01) |
| *H04N 19/67* | (2014.01) |

(52) U.S. Cl.
CPC ............ *H04N19/597* (2014.11); *H04N 19/67* (2014.11); *H04N 21/236* (2013.01)

(56) References Cited

U.S. PATENT DOCUMENTS

| | | | |
|---|---|---|---|
| 2003/0126238 | A1 | 7/2003 | Kohno et al. |
| 2004/0234235 | A1 | 11/2004 | Urata |
| 2006/0126919 | A1 | 6/2006 | Kitaura et al. |
| 2006/0262810 | A1 | 11/2006 | Vadakital et al. |
| 2009/0096864 | A1 | 4/2009 | Hwang et al. |
| 2009/0220213 | A1* | 9/2009 | Ogawa et al. .................. 386/95 |
| 2010/0259596 | A1* | 10/2010 | Park et al. ...................... 348/43 |

FOREIGN PATENT DOCUMENTS

| | | |
|---|---|---|
| CN | 1483289 | 3/2004 |
| CN | 101223723 | 7/2008 |
| CN | 101335594 | 12/2008 |
| CN | 101822049 | 9/2010 |
| DE | 60123280 | 5/2007 |
| DK | 1346578 | 1/2007 |
| EP | 1346578 | 9/2003 |
| EP | 1884055 | 2/2008 |
| EP | 2201774 | 6/2010 |
| JP | 6-309812 | 11/1994 |
| JP | 9-138384 | 5/1997 |
| JP | 2001-203749 | 7/2001 |
| JP | 2004-517534 | 6/2004 |
| JP | 3757857 | 1/2006 |
| JP | 2008-546238 | 12/2008 |
| KR | 10-2009-0038364 | 4/2009 |
| RU | 2 384 956 | 3/2010 |
| TW | 552783 | 9/2003 |
| WO | WO 2002/052862 | 7/2002 |
| WO | WO 2006/123231 | 11/2006 |
| WO | WO 2009/048309 | 4/2009 |

OTHER PUBLICATIONS

Knorr, Sebastian, et al. "Robust Concealment for Erroneous Block Bursts in Stereoscopic Images." Proceedings of 2nd Int'l Syposium on 3D Data Processing, Visualization and Transmission, 2004. pp. 820-827.*
Knorr, Sebastian et al., "Robust Concealment for Erroneous Block Bursts in Stereoscopic Images", 3D Data Processing, Visualization and Transmission, 2004. 3DPVT 2004. Proceedings. 2nd Internationl Symposium on Sep. 2004.*
A. Serdar Tan et al., "Error Resilient Layered Stereoscopic Video Streaming", 3DTV Conference, 2007. May 2007.*
Office Action issued in corresponding Japanese Application No. 2010-143649 dated May 20, 2014 and the English Translation.
"Mobile 3DTV Technology Demonstrator Based on Omap 3430" Atanas Gotchev et al., 2009, 16th International Conference on Digital Signal Processing, Jul. 2009.
Office Action issued in the corresponding Chinese application No. 201180003397.4 dated Dec. 4, 2013 and the English Translation,.
Atanas Gotchey et al., "Mobile 3DTV Technology Demonstrator Based on OMAP 3430", Digital Signal Processing, 2009 16th International Conference on Jul. 2009.
A. Serdar Tars et al., "Error Resilient Layered Steroscopic Video Streaming", 3DTV Conference, 2007, May 2007.
P.Y. Yip et al., "Joint Source and Channel Coding for H.264 Compliant Stereoscopic Video Transmission", Electrical and Computer Engineering, 2005. Canadian Conference on May 2005, pp. 188-191.
Sebastian Knorr et al., "Robust Concealment for Erroneous Block Bursts in Stereoscopic Images", 3D Data Processing, Visualization and Transmission, 2004. 3DPVT 2004. Proceedings. 2nd International Symposium on, Sep. 2004.
Partial Search Report issued in corresponding European Application No. 11797811.4 dated Sep. 6, 2016.

* cited by examiner

TRANSMISSION DEVICE, RECEPTION DEVICE AND COMMUNICATION SYSTEM

TECHNICAL FIELD

The present invention relates to a transmission device, a reception device and a communication system.

BACKGROUND ART

Recently, as disclosed, for example, in Patent Literature 1 below, a method is known in which an image for the left eye and an image for the right eye having parallax therebetween are alternately supplied to a display at a predetermined interval, and the images are viewed using glasses with liquid crystal shutters that are driven in synchronization with the predetermined interval.

Further, it is disclosed in Patent Literature 2 below that modes such as error control by FEC (Forward Error Correction) or error control on the basis of an automatic repeat request (ARQ) are changed in accordance with packet loss and error generating conditions in a network, and a packet transfer is performed.

In addition, as stereoscopic image encoding methods, a method is known, for example, in which the image for the left eye and the image for the right eye are each encoded while being considered to be individual video, and a method is known in which encoding is performed as multiview images by MVC (Multiview Video Coding). In Patent Literature 1 below, the method to perform encoding by MVC with respect to a plurality of video image data, such as stereoscopic video images etc., is disclosed. Further, in Patent Literature 2 below, a method is disclosed in which FEC strength (redundancy) is changed in accordance with a degree of priority.

CITATION LIST

Patent Literature

[PTL 1]
Japanese Patent Application Publication No. JP-A-9-138384
[PTL 2]
Japanese Patent No. 3757857

Non Patent Literature

[NPL 1]
Kimata Hideaki, "Trends in International Standardization of Multiview Video Coding MVC," Institute of Image Information and Television Engineers Journal, VOL. 61, No. 4 (2007), p. 426-430.
[NPL 2]
Alexander E. Mohr, Student Member, IEEE, Eve A. Riskin, Senior Member, IEEE, and Richard E. Lander, Member, IEEE, "Unequal Loss Protection: Graceful Degradation of Image Quality over Packet Erasure Channels Through Forward Error Correction", "IEEE JOURNAL ON SELECTED AREAS IN COMMUNICATIONS", VOL. 18, NO. 6, June 2000, p. 819-828.

SUMMARY OF INVENTION

Technical Problem

However, in a case in which a plurality of camera input video images are encoded and broadcast by live relay or transmitted by network, a problem arises in that an effect of the video images is lost due to delay, for example, a transmission delay from one camera relative to another, and packet loss. For example, in a case in which stereoscopic video images are transmitted as the plurality of camera input video images, a stereoscopic effect is strong, and when, due to network delay jitter or packet loss, part or some of the data of the video images are lost on one side only of the left and right video images having a large parallax therebetween and the video images are displayed in that state, a problem arises in that the stereoscopic effect is lost.

Further, when FEC processing is performed for packet loss recovery in order to avoid this type of problem, in a case of live relay etc. by a broadcast station, a delay of less than one frame of the video images is required. As a result, it is necessary to perform FEC processing while reducing the FEC encoding matrix to perform the FEC processing. However, when the matrix size is reduced, a delay size and a recovery rate have a trade off relationship, with a reduction in the packet loss recovery rate and so on. A system is therefore required in which a plurality of video images can be transmitted with high packet loss resilience and also low delay.

The present embodiment has been made in light of the foregoing circumstances, and the present embodiment aims to provide a novel and improved transmission device, reception device and communication system that are capable of transmitting a plurality of video image data with high packet loss resilience and also low delay.

Solution to Problem

In accordance with one embodiment, a video image data encoder comprises an input configured to receive stereoscopic image data. The stereoscopic image data includes first and second image data having chronological correspondence. An error correction encoding unit is configured to combine portions of the first image data and corresponding portions of the second image data from the input unit into a common encoding matrix. An error correcting code derived from the combined portions is added to the encoding matrix.

Advantageous Effects of Invention

According to the present embodiment, it is possible to provide a transmission device, a reception device and a communication system that are capable of transmitting a plurality of video image data with high packet loss resilience and also low delay.

DESCRIPTION OF EMBODIMENTS

Hereinafter, a preferred embodiment will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the order shown below.

(1) Overview of present embodiment
(2) Example of system configuration
(3) Priority-based FEC control
(4) CODEC-linked FEC control
(5) Processing procedure of transmission device
(6) Processing procedure of reception device (1) Overview of Present Embodiment In the present embodiment, in transmission of stereoscopic video images, when a plurality of camera input video images are encoded and transmitted, in order to transmit with low delay and also with high resilience to packet loss, packets of the plurality of camera video images that are picked up at the same time are processed in units of a same FEC encoding matrix. In addition, when packet loss recovery is not possible with the encoding matrix, by performing error concealment on a packet that has correlation in that matrix unit, it becomes possible to maintain the stereoscopic video effect. Note that, in the following explanation, an example is described in which stereoscopic video images are formed from images for the right eye and images for the left eye as input video images from a plurality of cameras, but the present embodiment is not limited to this example. The present embodiment can be widely applied to systems that perform transmission of a plurality of video images having a chronological correspondence, such as a plurality of video images that are simultaneously acquired from a several cameras, and in this case, it is possible to transmit a plurality of video image data with a high degree of packet loss resilience and also with low delay.

In addition, the encoding of the present embodiment is line-based encoding in which a plurality of scan lines of video image data are bundled and processed in line block units, and processing is possible with a low delay of less than a frame or a field. Further, by processing in block units, such as an FEC encoding block or matrix, an impact of packet loss that cannot be recovered can also be minimized to deterioration of a single part of an image frame.

Furthermore, a priority is attached in accordance with the stereoscopic video effect, namely in accordance with a size of the parallax, and concealment processing is performed, such as increasing FEC parity with respect to packets with a high impact on image quality (e.g. the left and right images represented by the packets are quite different), and reducing parity when there is a small impact (e.g. there is relatively little difference between the left and right images). For that reason, video images can be provided without losing the stereoscopic video effect.

It is assumed that the system according to the present embodiment has a configuration that is explained below. The video image encoding is low delay encoding processing in which processing is performed on a line basis, namely, in line block units of a plurality of lines (one line or more). Thus, the encoding processing is not performed after data are buffered in video frame units, and, as transmission and display are possible with a delay of less than a frame time period, it is particularly suitable for adoption in systems that perform real time video image transmission, such as live video distribution, and relay broadcasting. In the present system, stereoscopic video image (3D) compliant camera output video images are encoded and packetized for IP transmission, then FEC encoded in order to perform packet loss recovery in the network and transmitted. On the reception side, FEC decoding and packet loss recovery are performed and then video image decoding and display are performed.

(2) Example of System Configuration

Figure 1:
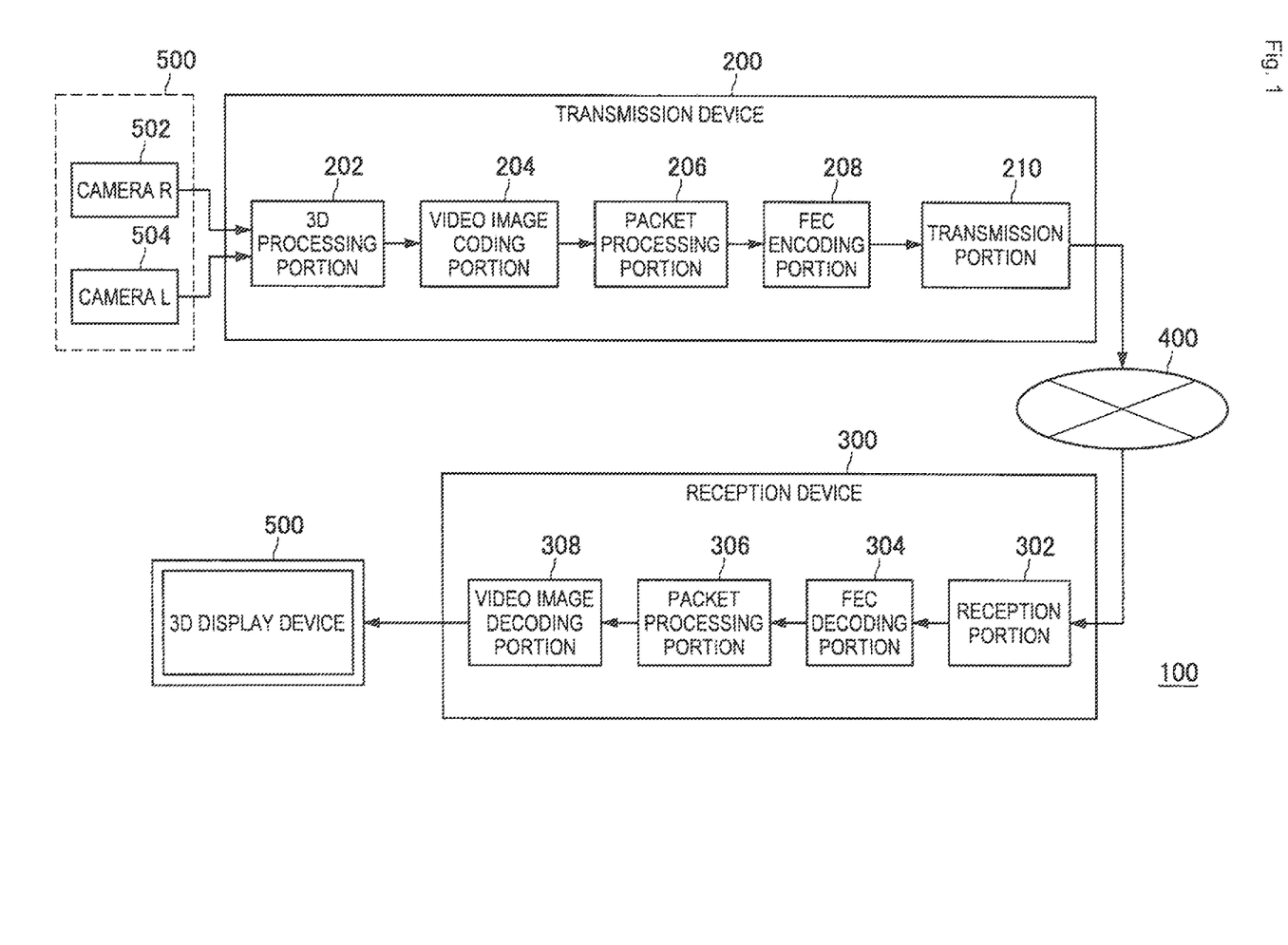
FIG. 1 is a schematic diagram showing a basic configuration of a communication system according to an embodiment of the present embodiment.

FIG. 1 is a schematic diagram showing a basic configuration of a communication system 100 according to the present embodiment. As shown in FIG. 1, the communication system 100 is formed of a transmission device 200 that has a camera video image input and a reception device 300 that has a display output. The transmission device 200 and the reception device 300 are connected via a network 400, such as the Internet.

As the stereoscopic video images, video images are used that are captured using a dedicated camera 500. In FIG. 1, an example is shown in which the stereoscopic video images are obtained from a camera (R) 502 that captures an image for the right eye R and a camera (L) 504 that captures an image for the left eye L. In this way, video images that are captured by at least two cameras can be used for the stereoscopic video images, but the system can be applied with even one camera, as long as the camera is compliant with stereoscopic video image capture. For example, even with a single reflex type 3D camera, if it is a system that obtains a 3D effect by forming left and right video images, it can be applied to the present system.

As shown in FIG. 1, the transmission device 200 is formed of a 3D processing portion 202, a video image coding portion 204, a packet processing portion 206, an FEC encoding portion 208 and a transmission portion 210. The 3D processing portion 202 brings about the stereoscopic video effect by performing, on the video images output from the camera 500, information processing such as calibration of video image data of the left and right cameras, and processing for 3D video images.

Compression processing is performed in the video image coding portion 204 on the video images on which 3D processing has been performed. After compression processing, packetization processing for communication (RTP (Real-time Transport Protocol) packetization) is performed by the packet processing portion 206. Packets output from the packet processing portion 206 are arranged in an FEC encoding matrix (to be explained later) by the FEC encoding portion 208 and FEC processing is performed. In this way, a parity packet that is formed of parity only, is generated. Header processing is performed on this parity packet, and is transmitted as a UDP/IP packet from the transmission portion 210 to the network 400.

Further, the reception device 300 is formed of a reception portion 302, an FEC decoding portion 304, a packet processing portion 306 and a video image decoding portion 308. The reception portion 302 receives IP packets transmitted from the transmission device 200 via the network 400. If the reception portion 302 recognizes, by the packet header, the data on which FEC processing has been performed, an FEC matrix is formed by the FEC decoding portion 304, and, if there is packet loss, the parity in the parity packet is used and FEC decoding is performed. Lost packets can be recovered in this way. A code stream obtained from the packet data is decoded by the video image decoding portion 308 and left and right video image data are output to a 3D display device 500. In the packet loss recovery processing, after decoding, a substitute section is selected from a preceding frame and display is performed.

Figure 2:
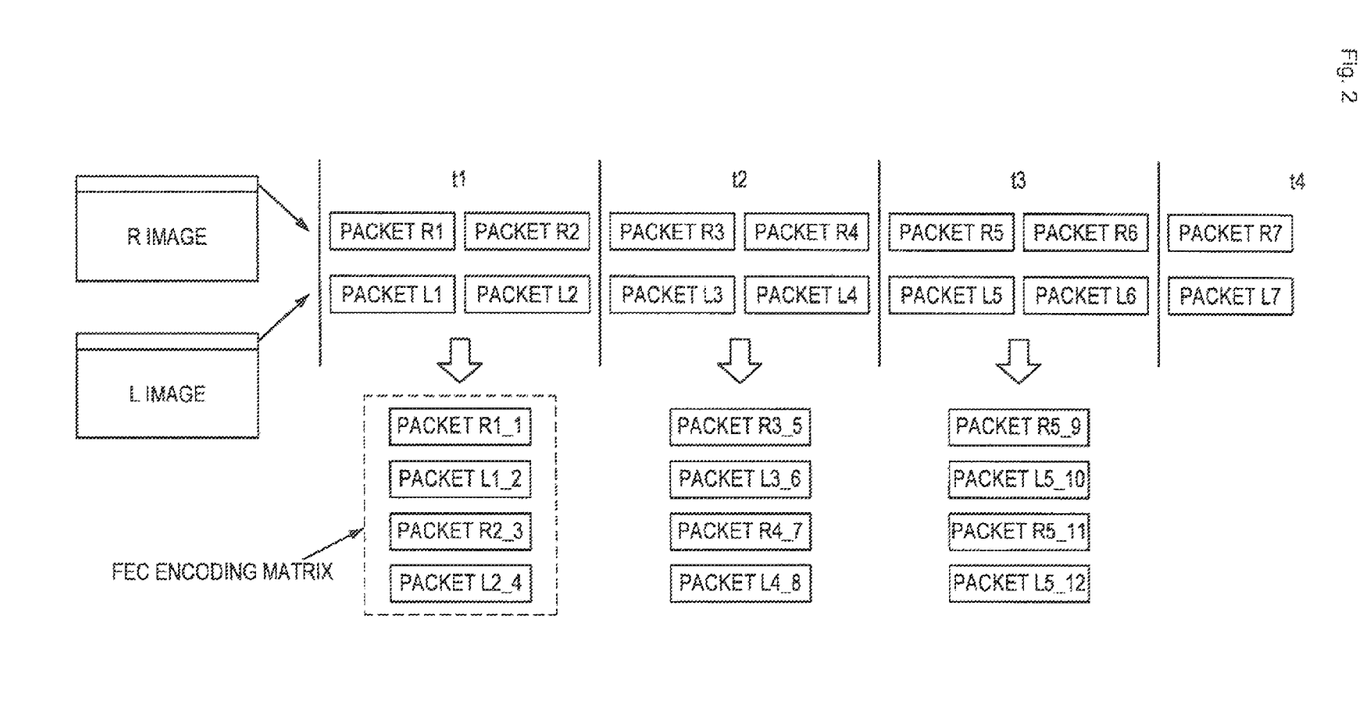
FIG. 2 is a schematic diagram illustrating a low delay FEC processing method according to the present embodiment.

FIG. 2 is a schematic diagram illustrating a low delay FEC processing method according to the present embodiment. In the illustration here, an example is used in which the two cameras (the camera 502 and the camera 504) are aligned and 3D image capture is performed of left and right video images (an R image and an L image). As shown in FIG. 2, packets R1, R2 to R7 and so on are generated from the R image, and packets L1, L2 to L7 and so on are generated from the L image. In the present embodiment, when FEC processing is performed in packet units, as one example, a matrix is formed by aligning four of the packets in a column-wise direction, as shown in FIG. 2.

Figure 3:
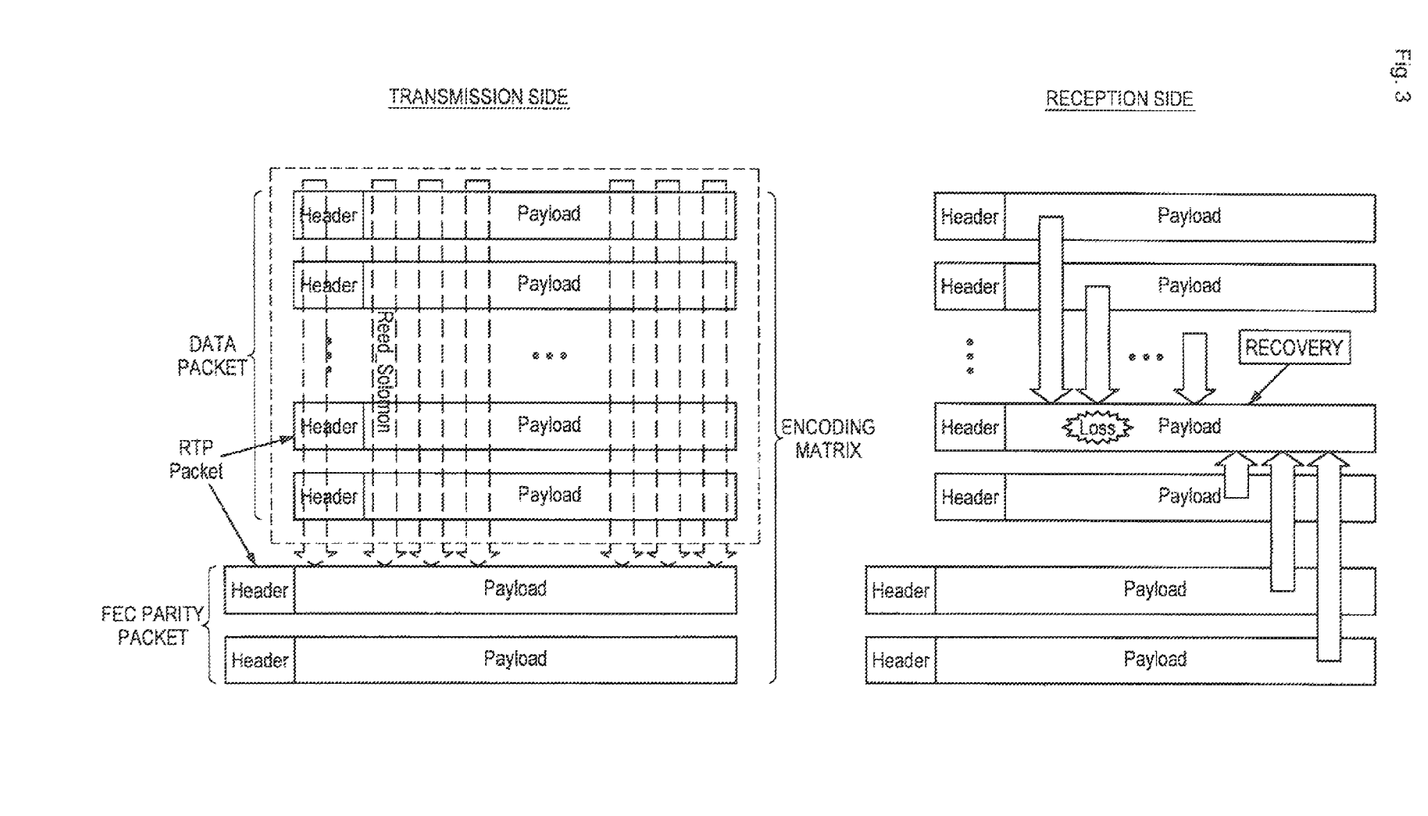
FIG. 3 is a schematic diagram showing a method to generate an FEC encoding matrix.

FIG. 3 is a schematic diagram showing a method to generate a prerequisite FEC encoding matrix. Processing on the transmission side is performed in the FEC encoding portion 208 and processing on the reception side is performed in the FEC decoding portion 304. In the present embodiment, as shown in FIG. 3, a single FEC encoding matrix is formed by four packets. On the side of the transmission device 200, as the FEC (as the forward error correction), encoding is performed using Reed-Solomon codes for example, the encoding being performed in byte units in the column-wise direction. Parity data are generated in accordance with a parity number. The parity data are aligned in the transverse direction and parity packets (FEC parity packets shown in FIG. 3) are generated. FEC headers are attached to the parity packets and the packets are transmitted. Further, on the side of the reception device 300, if it is detected by the FEC decoding portion 304 that an error (LOSS) has occurred of a given packet, the parity packet is used to cause recovery of the data in which the error occurred.

In the present embodiment, in a low delay CODEC, left and right image data are encoded in units of line blocks that are formed of a plurality of lines, then packetized and transmitted. As described above, the single FEC encoding matrix is formed of the four packets. For that reason, when the stereoscopic video images are the usual two sets of data of the image for the right eye (the R image) and the image for the left eye (the L image), if it is assumed that the FEC encoding matrix is generated using only the R image shown in FIG. 2, a time to generate four packets (t1+t2) is required to generate the matrix. In the present embodiment, by using packets in which the L image and the R image in the same time period t1 are each encoded, data of the four packets (the packets R1, R2, L1 and L2) can be obtained in only the time t1 shown in FIG. 2, and it is possible to generate the FEC encoding matrix with a delay of the time t1. As a result, according to the method of the present embodiment, it is possible to reduce delay caused by encoding to a minimum.

As an encoding method, MVC (Multiview Video Coding) is used, for example. In MVC, a structure incorporates not only temporal direction prediction, but also incorporates prediction between a plurality of cameras. In other words, not only frame prediction in a temporal direction, but also prediction using a difference between the left and right images L and R are used. Then, using video image encoded data of reference image data that serves as a base and parallax information with respect to the reference data, encoding data to generate a predicted image are respectively packetized and the packets are processed using the same FEC encoding matrix. Note that the system disclosed in Patent Literature 1 described above can be used as the MVC encoding method.

(3) Priority-Based FEC Control (ULP: Unequal Loss Protection)

Figure 4:
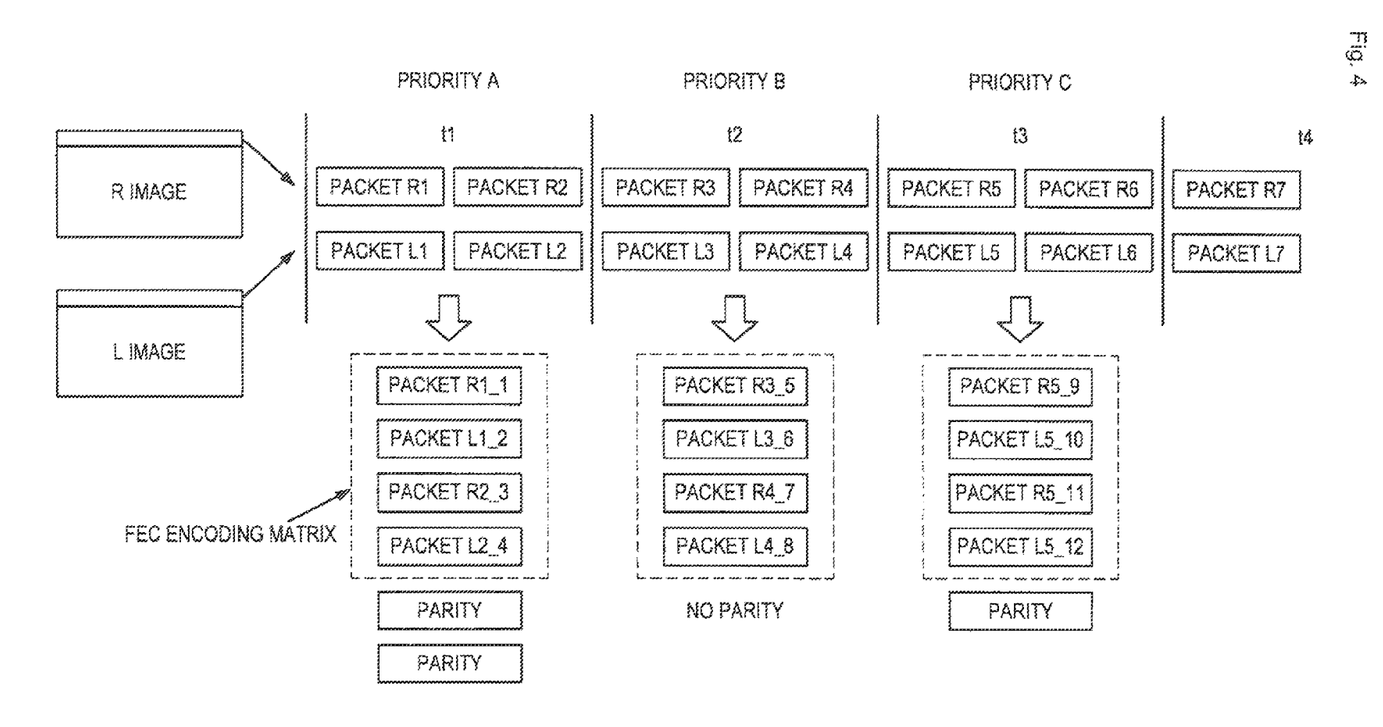
FIG. 4 is a schematic diagram showing a method to generate a priority-based FEC control encoding matrix.

Next, priority-based FEC control according to the present embodiment will be explained. FIG. 4 is a schematic diagram showing a method to generate a priority-based FEC control encoding matrix. Further, FIG. 5 is a block diagram showing an example of a configuration to perform priority-based FEC control and CODEC-linked FEC control, which will be explained later.

Figure 5:
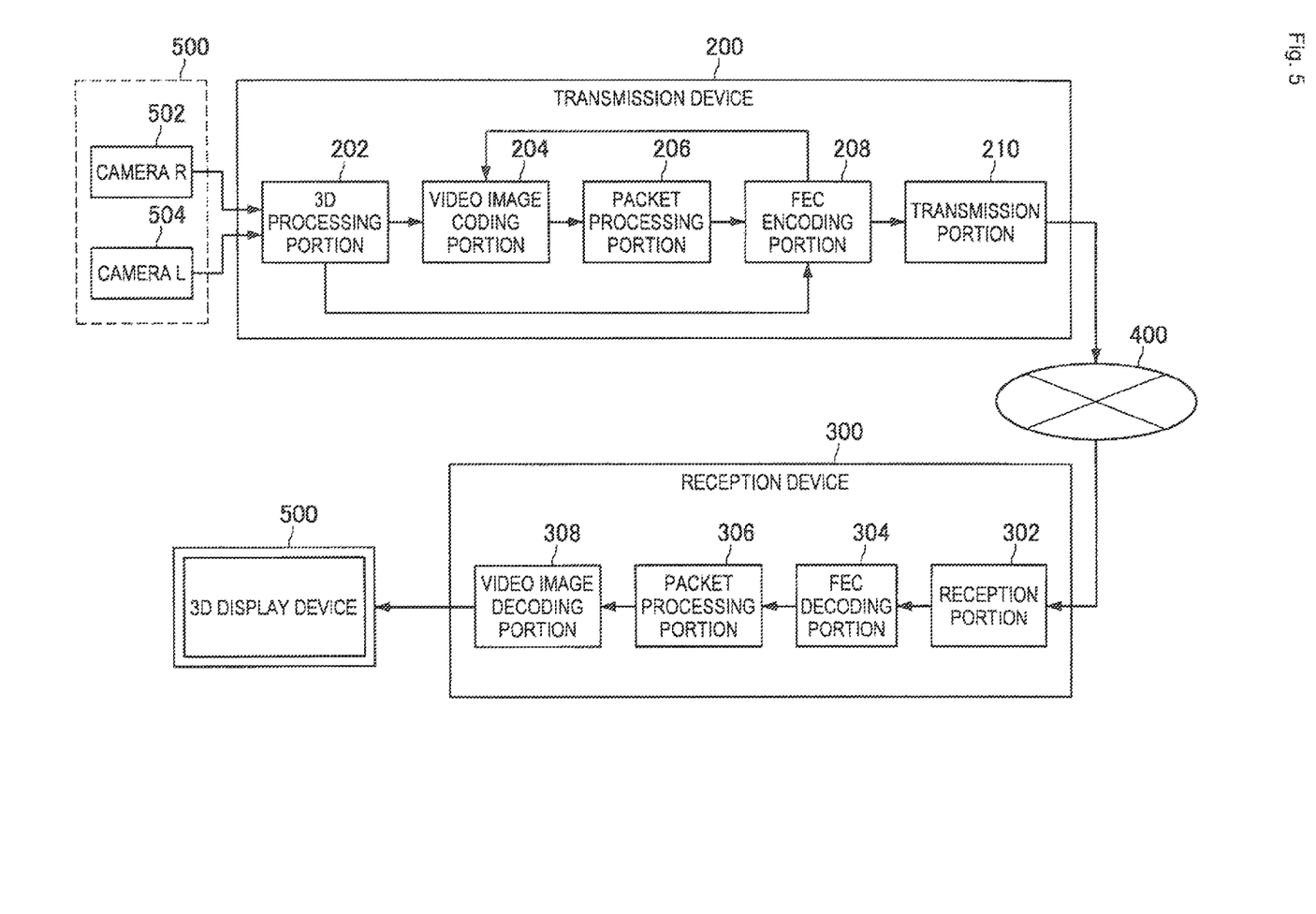
FIG. 5 is a block diagram showing an example of a configuration to perform priority-based FEC control and CODEC-linked FEC control.

In FIG. 5, the 3D processing portion 202 acquires, from among 3D video image data transmitted from the camera 500, parallax information, color-difference information etc. relating to the 3D video image, and sorts the video image data into degrees of priority based on the obtained information. The priority information is then input into the FEC encoding portion 208. In the FEC encoding portion 208, the FEC strength, namely the parity number (redundancy), is updated based on the priority information.

For example, in order from a highest degree of priority, it is assumed that a priority A, a priority B, and a priority C are set, and that it is established in advance that two parity packets are attached to priority A video image data, one parity packet is attached to priority B video image data and no parity packet is attached to priority C video image data. In this case, with respect to the FEC encoding matrix, as shown in FIG. 4, two parity packets are attached to the priority A time period t1, no parity packet is attached to the priority C time period t2, and one parity packet is attached to the priority B time period t3.

In a case in which a visual perception of the amount of pop out and the degree of depth of the stereoscopic video images is large, namely, in a case in which the parallax between the L image and the R image is great, an effect of the stereoscopic video images is high, and thus the priority is set high. As a result, with respect to the video image data that have a high effect as stereoscopic video images, a higher number of parity packets are attached, and, if data loss occurs, the data can be reliably recovered. It is thus possible to avoid loss of the 3D effect. On the other hand, in a case in which the visual perception of the amount of pop out and the degree of depth of the stereoscopic video images is small, a degree of importance as 3D video images is relatively low, a low priority is set, and the parity packets are fewer. In a similar manner, the larger a color difference or the larger a difference in luminance between the L image and the R image, the higher the priority is set. In the way described above, with the priority-based FEC control according to the present embodiment, the parity packets can be attached in accordance with priority information based on the video image data, and when loss occurs in the data with a high priority, recovery can be reliably performed on the reception side.

(4) CODEC-Linked FEC Control

Next, CODEC-linked FEC control according to the present embodiment will be explained. In the CODEC-linked FEC control, a total amount of data to which the parity packet is attached is calculated by the FEC encoding portion 208, based on the priority information. Normally, a constant bit rate or a maximum bit rate etc. that is set when transmitting video image data is determined based on band restrictions and a reserved bandwidth and the like. For that reason, as shown in FIG. 5, the FEC encoding portion 208 feeds back information indicating a total amount of the data to a CODEC (the video image coding portion 204) and adjusts, in conjunction with the video image coding portion 204, the bit rate after encoding. In this way, the total amount of data after the FEC processing can be controlled to be equal to or less than a constant range.

When explaining using the example shown in FIG. 4, two parity packets are attached in the priority A time period t1, but if the bit rate exceeds a fixed value, an encoding rate is adjusted by the video image coding portion 204 to be within a range in which the bit rate does not exceed an upper limit. In the video image coding portion 204, the encoding rate is adjusted by performing processing such as data thinning-out, interpolation etc. In a similar manner, with respect to the priority C time period t2 and the priority B time period t3, the encoding rate is adjusted within the range in which the bit rate does not exceed the upper limit. In time periods in which the priority is low, if the bit rate is in a range that does not exceed the upper limit, a greater number of parity packets may be attached than the number that otherwise would be attached for that low priority. In the above-described manner, as well as attaching the parity packets in accordance with the priority set by the priority-based FEC control, it is possible to perform transmission with a data amount that is equal to or less than a fixed bit rate.

(5) Processing Procedure of Transmission Device

Figure 6:
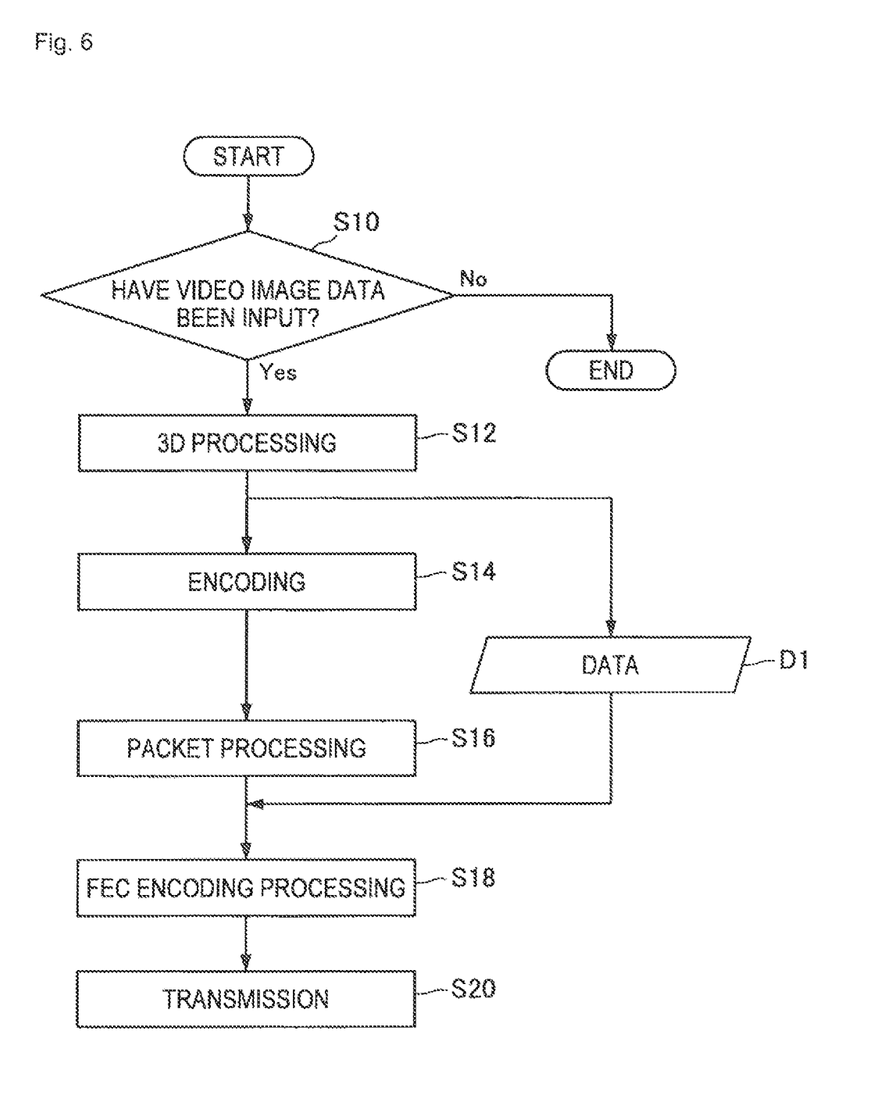
FIG. 6 is a flow chart showing a processing procedure of a transmission device.

Next, a processing procedure according to the transmission device 200 of the present embodiment will be explained. FIG. 6 is a flow chart showing the processing procedure of the transmission device 200. First, at step S10, it is determined whether or not the video image data has been input from the camera 500. If the video image data has been input, the processing advances to step S12, and if the video image data has not been input, the processing is ended. At step S12, 3D processing is performed by the 3D processing portion 202, and the parallax information and color-difference information etc. between the left and right images, which are included in the video image data, are acquired. In addition, in the 3D processing at step S12, a processing is performed to acquire audio data and to acquire subtitle data and the like. Further, when the 3D data is to be converted to side-by-side data, top-and-bottom data etc., conversion processing is performed.

Next, at step S14, processing is performed by the video image coding portion 204 to encode the video image data. Next, at step S16, processing is performed by the packet processing portion 206 to packetize the video image data. Further, at step S12 performed by the 3D processing portion 202, information (data D1 shown in FIG. 6) is acquired that indicates whether or not the left and right video image data are of a same time, and this information is used when performing FEC encoding processing at step S18. This information is used to determine whether these data are associated with the video image data at the time of 3D processing and whether these data are input into a same matrix as correlating packets, at the time of the FEC encoding processing (step S18).

Then, at step S18, the FEC encoding processing is performed by the FEC encoding portion 208, and next, at step S20, transmission processing is performed by the transmission portion 210.

Further, when the CODEC-linked FEC control is being performed, the encoding processing at step S14 is performed such that a bit rate of the video image data that is acquired in the FEC encoding processing at step S18 does not exceed a predetermined threshold.

(6) Processing Procedure of Reception Device

Figure 7:
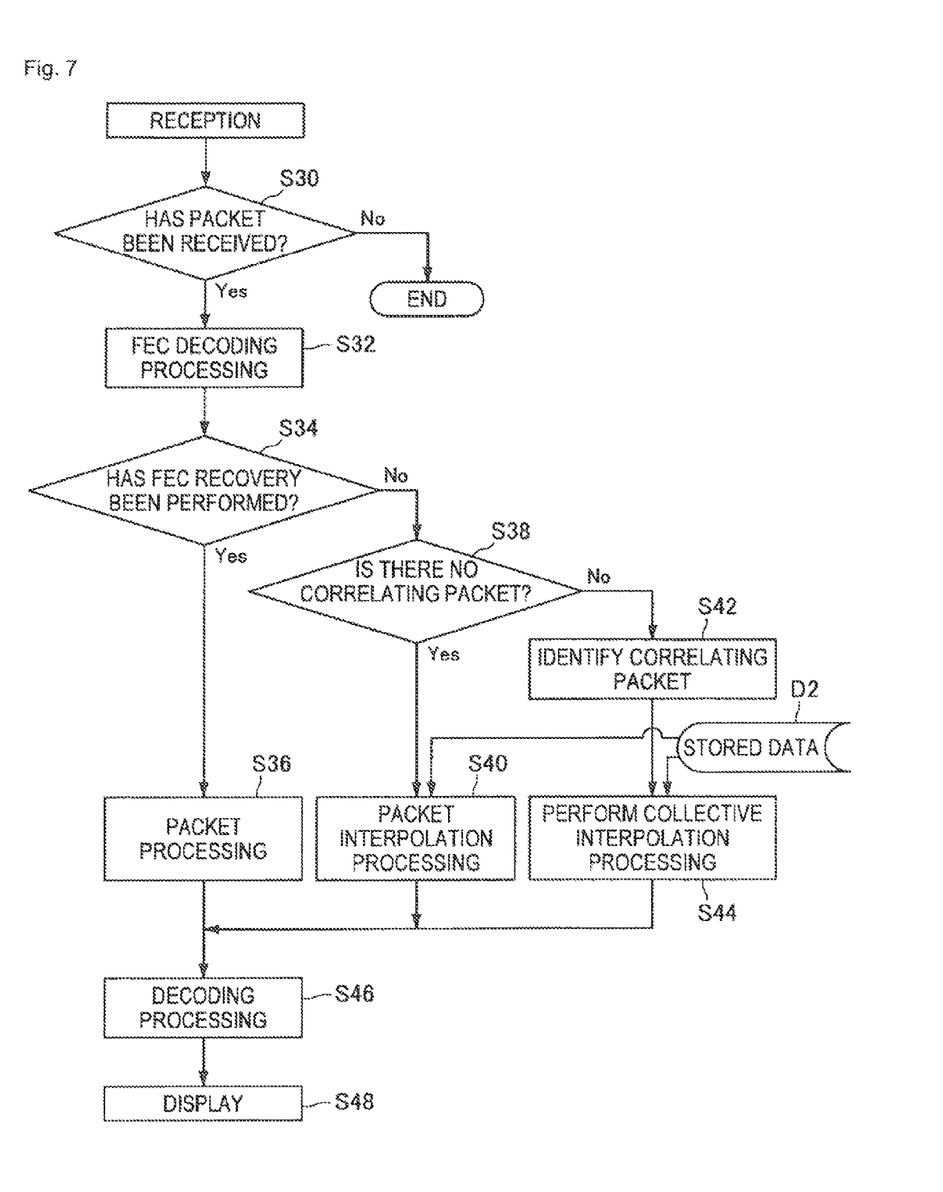
FIG. 7 is a flow chart showing a processing procedure of a reception device.

Next, a processing procedure according to the reception device 300 of the present embodiment will be explained. FIG. 7 is a flow chart showing the processing procedure of the reception device 300. First, at step S30, it is determined whether or not the reception portion 302 has received a packet. If a packet has been received at step S30, the processing advances to step S32. On the other hand, if a packet has not been received at step S30, the processing is ended.

At step S32, FEC decoding processing is performed by the FEC decoding portion 304. Next, at step S34, it is determined whether or not recovery of data lost in the FEC decoding processing is complete. When the data recovery is complete, the processing advances to step S36 and packet processing is performed by the packet processing portion 306.

On the other hand, when the data recovery at step S34 is not complete, the processing advances to processing from step S38 onwards. In other words, when a number of packet losses is in excess of a number that can be recovered by the FEC processing, complete data packet recovery cannot be achieved by FEC, and the processing advances to a flow from step S38 onwards to perform interpolation processing.

At step S38, it is determined whether or not, with respect to the left and right video image data, correlating packets, which have a high degree of correlation, exist. For example, packets of left and right video image data that are picked up at the same time exhibit relatively high correlation. When correlating packets do not exist, the processing advances to step S40, and interpolation processing is performed on data that was not recovered. In this way, when there are no correlating packets, for example, when there is no 3D effect in the left and right video images, and there is no difference between information of the left and right video images, at step S40, interpolation processing is performed only on lost packets. In this case, at step S40, error concealment processing is performed in which, for example, data of a preceding frame is extracted from stored data D and substituted. Note that the data of the preceding frame (stored data D2) is temporarily stored in a buffer etc. In addition, when only video image data for the right eye has not been recovered, processing is performed to display the video images for the left eye only.

On the other hand, when correlating packets exist at step S38, the processing advances to step S42. At step S42, processing is performed to identify the correlating packets. Here, for example, it is identified, from among a plurality of frames, in which frames the left and right video images have a high correlation.

Figure 10:
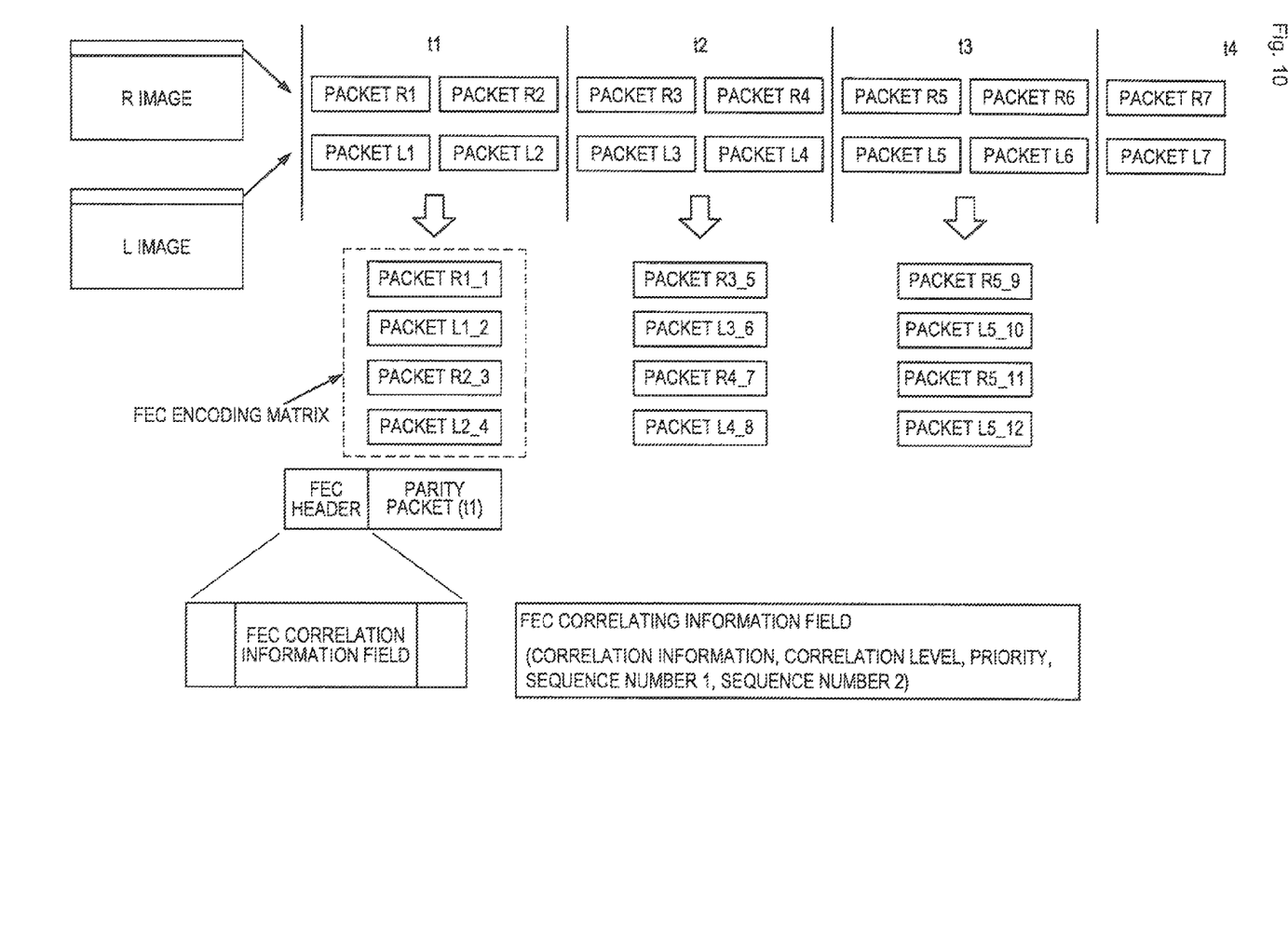
FIG. 10 is a schematic diagram showing information of an FEC header provided in a parity packet.

FIG. 10 is a schematic diagram showing information of an FEC header provided in the parity packet. Information that indicates whether or not correlation between the left and right video images is high is included in an FEC correlation information field that is stored in an FEC packet header shown in FIG. 10. The FEC correlation information field stores information such as correlation information, a correlation level, a priority, sequence numbers, time information etc. This field is used to identify correlating packets at the time of FEC decoding, using a method in which sequence numbers indicate a type of correlation, a correlation level, a priority, and which packet correlates to which packet, for example.

After step S42, the processing advances to step S44. At step S44, collective interpolation processing is performed by the packet processing portion 306. More specifically, when there is correlation between the left and right images, the correlating packets are identified from the FEC correlation information field stored in the FEC packet header shown in FIG. 10, and interpolation processing is performed based on packet data correlating to a lost packet. That is, interpolation of, for example, a lost packet of the left image is based upon the correlated packet of the right image, and vice versa.

As described above, when data recovery is not possible according to the processing shown in FIG. 7, it is possible to perform data interpolation processing based on whether or not correlating packets exist. It is therefore possible to appropriately perform interpolation processing in accordance with a degree of correlation between the left and right video images.

Figure 8:
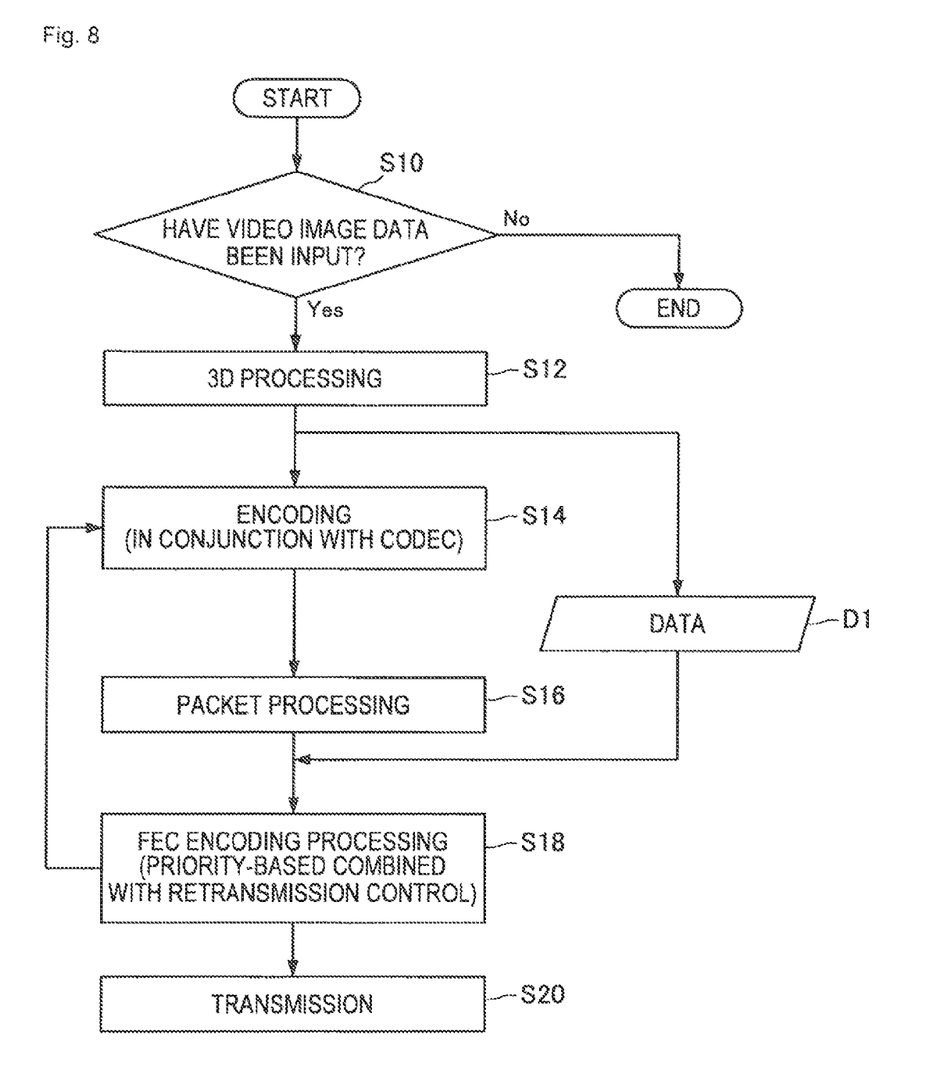
FIG. 8 is a flow chart showing processing corresponding to the priority-based FEC control and the CODEC-linked FEC control, and processing corresponding to dynamic QoS control.

Next, another processing procedure according to the transmission device 200 will be explained. FIG. 8 is a flow chart showing processing corresponding to the above-described priority-based FEC control and the CODEC-linked FEC control, and processing corresponding to dynamic QoS control. As described above, in the priority-based FEC control, a deterioration in stereoscopic video effect caused by the impact of packet loss during transmission is minimized by changing the FEC strength depending on whether data has a large parallax and a strong stereoscopic video effect or whether data has a small parallax and a weak stereoscopic video effect. When the priority-based FEC control is performed, in the 3D processing at step S12, the priority of the video image data is sorted. Then, in the FEC encoding processing at step S18, the FEC encoding processing is performed in accordance with the priority.

Therefore, as step S18 shown in FIG. 8, the FEC encoding portion 208 performs processing to change the number of parity packets in accordance with the packet priority.

As described above, the CODEC-linked FEC control links fluctuations in a bandwidth for transmission to the encoding rate control of the CODEC, by changing the FEC strength depending on whether data has a large parallax and a strong stereoscopic video effect or whether data has a small parallax and a weak stereoscopic video effect. In this way, it is possible to perform transmission in which a rate of transmission of packets after FEC encoding is within a range of a fixed bit rate. Thus, at step S18 shown in FIG. 8, the FEC encoding portion 208 feeds back the total amount of data after the FEC encoding to the encoding processing performed at step S12. Then, at step S12 shown in FIG. 8, the video image coding portion 204 performs "thinning out" or interpolation processing in accordance with the data amount and performs control such that the total data amount does not exceed the upper limit.

Further, in dynamic QoS control according to the present embodiment, the FEC encoding portion 208 performs processing for packet loss recovery by combining retransmission control, such as ARQ (Auto Repeat Request) control, with the FEC. The ARQ control can use the method disclosed in Patent Literature 2 described above. More specifically, as the packet loss recovery method, rather than only FEC, packet losses can be more reliably recovered by hybrid QoS control that concurrently uses retransmission control (ARQ). When error correction by the FEC is possible, the FEC encoding portion 208 performs error correction by FEC. Further, when error correction is not possible by FEC, the FEC encoding portion 208 performs ARQ processing as a retransmission request. At this time, the FEC encoding portion 208 generates a retransmission request RTCP packet, and transmits the RTCP packet to the transmission device 200. Thus, at step S18 shown in FIG. 8, the FEC encoding portion 208 performs processing for packet loss recovery that combines the retransmission control and the FEC, and when the retransmission request is received from the reception device 300, the packet is retransmitted. Note that, when retransmission control is performed, the reception portion 302 of the reception device 300 functions as a transmission portion, and the transmission portion 210 of the transmission device 200 functions as a reception portion, and the retransmission request is transmitted from the reception device 300 to the transmission device 200 via the network 400. At this time, it is also possible to set up a system in which the QoS control method for packet loss recovery or strength is changed in accordance with the bandwidth of the transmission path, parallax information, luminance information and color-difference information etc.

Figure 9:
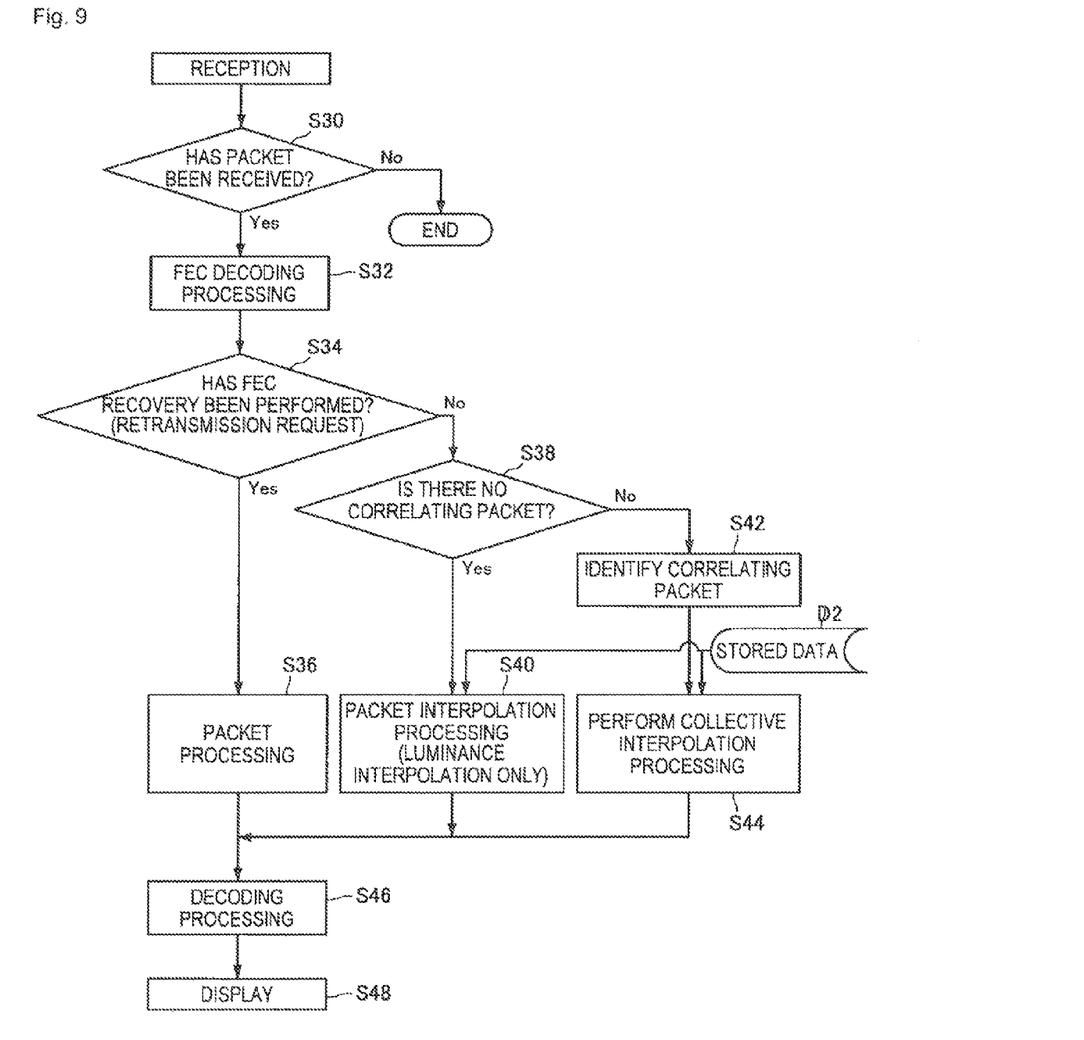
FIG. 9 is a flow chart showing another processing procedure of the reception device.

FIG. 9 is a flow chart showing another processing procedure of the reception device 300. FIG. 9 shows processing to change the FEC strength using luminance information and color-difference information, for example, to raise the FEC strength while taking particular account of the luminance information. In this case, in the interpolation processing at step S40, in addition to the above-described method to substitute data of the preceding frame, when the color-difference information is lost and cannot be recovered, processing is performed to interpolate luminance (Y) only.

In addition, in the dynamic QoS control corresponding to the transmission device 200 as illustrated by FIG. 8, as a result of determination of FEC recovery at step S34, when recovery is not possible by FEC, processing is performed to transmit, to the transmission device 200, a retransmission request by ARQ.

(7) Handling of Subtitle Information and Audio Information

Next, processing of subtitle information will be explained. A degree of priority of the subtitle information may be set to be higher than that of the video images, and can be handled as special information with respect to video image information. As one example, redundancy with respect to the subtitle information can be made higher than the video image information. Further, a method is conceivable that uses SVC (Scalable Video Codec) layers and the degree of priority. This is a method in which an FEC amount is changed in accordance with a degree of importance of the layer, and a processing method is possible that shortens delay time by performing processing on each layer of a plurality of channels using a single encoding matrix. As an example, more important images, such as low frequency images, are considered to be more important layers and have a higher degree of priority.

In addition, audio information can be handled in a similar manner, in which data of a plurality of channels are multiplexed on a single FEC encoding matrix and processed, and packets relating to surround etc. can be collectively processed when packet loss occurs.

As described above, according to the present embodiment, it is possible to construct a 3D video image live transmission system with low delay and also high resilience to packet loss. Then, even if packet loss recovery cannot be performed, video images that do not lose the stereoscopic video effect can be provided by interpolation processing. Furthermore, by performing FEC processing in accordance with a degree of strength of the stereoscopic video effect, video images can be provided which do not lose the stereoscopic video effect. In addition, it is possible to curb the transmission bandwidth to be equal to or less than a certain bandwidth, even while enhancing packet loss resilience.

The exemplary embodiment is described in detail above with reference to the appended drawings. However, the present invention is not limited to the above-described examples. It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Communication system
200 Transmission device
202 3D processing portion
208 FEC encoding portion
300 Reception device
302 Reception portion
304 FEC decoding portion

The invention claimed is:

1. A video image data encoder comprising:
an input configured to receive stereoscopic image data, including first and second image data packets having chronological correspondence, said first and second image data packets representing images sensed by left and right eyes, respectively, and having parallax therebetween; and
an error correction encoding unit configured to combine packets of said first image data and corresponding packets of said second image data from said input unit into a common encoding matrix and adding to said encoding matrix an error correcting code derived from said combined first image packets and second image packets of the common encoding matrix, the error correcting code having at least one packet unit of error correcting code data added to the common encoding matrix which has at least one packet unit of said first image data and at least one corresponding packet unit of said second image data, the number of packets units of error correcting code data being based on the parallax of the first and second image data.

2. The image data encoder of claim 1, wherein said chronological correspondence is substantially simultaneously produced left eye and right eye image data.

3. The image data encoder of claim 1, wherein said error correction encoding unit combines plural data packets of said first image data and plural data packets of said second image data into a common encoding matrix; and said error correcting code comprises at least one packet of parity data derived from said data packets in said common encoding matrix.

4. The image data encoder of claim 3, wherein said error correcting code comprises at least one additional packet of parity data derived from said data packets in said common encoding matrix.

5. The image data encoder of claim 3, wherein said data packets of said first and second image data that are combined into said common encoding matrix represent images picked up in a common time period by stereoscopic image pickup apparatus; and wherein said input unit assigns priority levels to the data packets of image data picked up in respective time periods.

6. The image data encoder of claim 5, wherein said error correcting code comprises a greater number of packets of parity data for common encoding matrices containing data packets of higher priority levels than for common encoding matrices containing data packets of lesser priority levels.

7. The image data encoder of claim 6, wherein the priority levels assigned to data packets in a respective time period is a function of at least one of parallax and color difference between said first and second image data.

8. The image data encoder of claim 7, wherein said error correction encoding unit is configured to identify those data packets of said first image data that correlate with data packets of said second image data in a common encoding matrix.

9. A video image encoder that encodes stereoscopic image data in an error correcting code, comprising:
an image acquisition unit configured to acquire video image data representing left and right images picked up in successive time periods, representing images sensed by left and right eyes, respectively, and having parallax therebetween;
a packetizing unit configured to form left image data packets of left image data and right image data packets of right image data and to assign priority levels to the data packets in said time periods, wherein the priority levels are a function of at least one of parallax and color difference between the left image data and the right image data; and
a forward error correcting (FEC) unit configured to form FEC encoding matrices of the left and right image data packets in said successive time periods, each FEC encoding matrix containing the left and right image data packets in a respective time period and at least one parity packet derived from the left and right image data packets in the FEC encoding matrix, a larger number of parity packets assigned to the data packets of higher priority level in said respective time period in the FEC encoding matrix, and at least one parity packet applied to both at least one left image data packet and at least one right image data packet.

10. An image transmitter, comprising:
an image acquisition unit configured to acquire video image data representing left and right images picked up in successive time periods, representing images sensed by left and right eyes, respectively, and having parallax therebetween;
a packetizing unit configured to form left image data packets of left image data and right image data packets of right image data and to assign priority levels to the data packets in said time periods, wherein the priority levels are a function of at least one of parallax and color difference between the left image data and the right image data;
a forward error correcting (FEC) unit configured to form FEC encoding matrices of the left and right image data packets in said successive time periods, each FEC encoding matrix containing the left and right image data packets in a respective time period and at least one parity packet derived from the left and right image data packets in the FEC encoding matrix, a larger number of parity packets assigned to the data packets of higher priority level in said respective time period in the FEC encoding matrix, and at least one parity packet applied to both at least one left image data packet and to at least one right image data packet; and
a transmission unit configured to transmit the FEC encoding matrices.

11. Image receiving apparatus, comprising:
a receiving unit configured to receive error corrected encoded matrices of image data, each matrix including left and right image data packets, representing left and right images acquired in a common time period, correlation information identifying correlating left and right image data packets in said matrix, and a number of parity packets, each parity packet derived from the left and right image data packets in said matrix, the number of parity packets being determined by the difference between the left and right image data and at least one parity packet applied to both at least one left image data packet and at least one right image data packet;

an error-correction decoding unit configured to recover the left and right image data packets in a received matrix, using said parity packets if an error is present in the received matrix; and a packet processing unit configured to perform collective interpolation processing using the left image data packet if the correlated right image data packet is lost and the right image data packet is used if the correlated left image data packet is lost so as to produce interpolated data packets.

\* \* \* \* \*